Oct. 7, 1958  G. H. FATHAUER  2,854,901
CAMERA AND MIRROR ARRANGEMENT
Filed April 26, 1955  2 Sheets-Sheet 1

Inventor
GEORGE H. FATHAUER

Oct. 7, 1958 G. H. FATHAUER 2,854,901
CAMERA AND MIRROR ARRANGEMENT
Filed April 26, 1955 2 Sheets-Sheet 2

Inventor
GEORGE H. FATHAUER
by
Attys.

United States Patent Office 2,854,901
Patented Oct. 7, 1958

2,854,901

CAMERA AND MIRROR ARRANGEMENT

George H. Fathauer, Decatur, Ill., assignor to Thompson Products, Inc., Cleveland, Ohio, a corporation of Ohio Application April 26, 1955, Serial No. 504,019

5 Claims. (Cl. 95—12)

This invention relates to a television camera housing arrangement and more particularly to a housing arrangement for use with a television camera in conjunction with motion picture and slide projectors or the like.

In the use of a television camera with motion picture and slide projectors, it has heretofore been the practice to dispose the camera in alignment with one projector with a field lens therebetween and with one or more partially transmitting reflectors or mirrors disposed between the field lens and such one projector so that one or more additional projectors may be disposed at the side to project from the surfaces of the partially transmitting reflectors or mirrors through the field lens into the lens of the camera.

This arrangement requires a considerable amount of space which is usually at a premium in television broadcast stations, and this invention was evolved with the object of performing the functions of this arrangement in less space.

According to this invention, a field lens is mounted with its axis in spaced generally parallel relation to the axis of the camera lens with the light-exit face or side of the field lens (i. e. the side from which an image is projected) and the light-entrant face or side of the camera lens facing in the same direction, means being provided for transmitting into the camera lens an image projected by the field lens. With this arrangement, the camera and the field lens are in generally parallel relation instead of in axially aligned relation, and the camera may be mounted above, below or in side-by-side relation to the field lens to effect a considerable savings in space requirements. In a preferred arrangement, the camera is mounted below the field lens.

The image may be transmitted into the camera lens from the field lens by means of mirrors and preferably with a first mirror in the path of light projected from the field lens and a second mirror in the path of light projected from the first mirror for projecting light into the camera lens. An infinite number of angular relationships of the field lens, mirrors and camera are possible. For simplicity, the axes of the field lens and the camera lens are exactly parallel and each of the mirrors is mounted at a 45° angle relative to such axes.

The field lens and the means used to project light from the field lens into the camera are preferably mounted within a housing and such housing may have an opening for projection of an image from a projector axially into the receiving side of the field lens. To permit use of additional projectors, the housing may have additional openings for projection of light from projectors outside the housing into the housing in directions transverse to the axis of the field lens and partially transmitting reflectors or mirrors may be mounted between the first opening and the field lens in positions such as to project light from the additional openings into the light-entrant side of the field lens. The housing, in addition to supporting the field lens and the mirrors, may also support the camera.

It will, accordingly, be appreciated that this invention provides a very simple and extremely compact arrangement for projection of images from one or more slide or motion picture projectors into a television camera.

This invention contemplates other objects, features and advantages which will become more fully apparent from the following detailed description taken in conjunction with the accompanying drawing which illustrates a preferred embodiment and in which.

Figure 1:
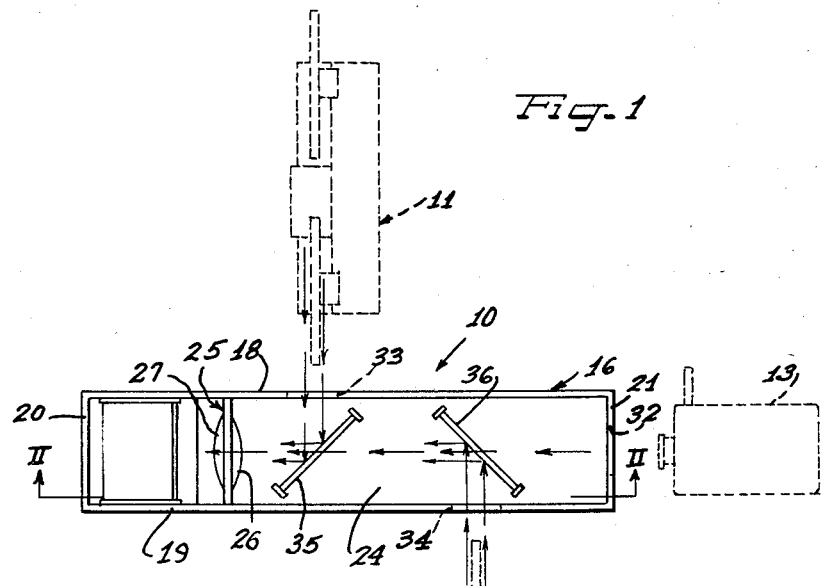
Figure 1 is a top plan view of a housing arrangement constructed according to the principles of this invention with the cover of the housing removed and with the position of projectors relative to the housing being indicated in dotted lines.

Reference numeral 10 generally designates an arrangement constructed according to the principles of this invention which may be used for the projection of images from motion picture projectors 11 and 12 and a slide projector 13, indicated in dotted lines, into the lens 14 of a television camera 15.

The arrangement 10 comprises a generally rectangular housing 16 having a bottom 17, side walls 18 and 19, a rearward end wall 20, a partial front end wall 21 and a cover 22, the cover 22 being not shown in the top plan view of Figure 1. The camera 15 is shown as disposed on the bottom wall 17 with the lens 14 facing the rear wall 20, the lower edge of the partial front wall 21 being spaced above the bottom wall 17 to provide access to controls 23 on the camera 15, and removal of the camera 15 from the housing 16 when desired.

A support wall 24 is disposed above the camera 15 and in spaced relation below the cover 22 to extend from the lower edge of the partial front wall 21 to a point spaced from the rear wall 20. Supported on this support wall 24 and between the sides 18 and 19 is a field lens 25 having a light-entrant face or side 26 facing the front wall 21 and a light-exit side 27 facing the rear wall 20.

A mirror 28 is supported between the side walls 18 and 19 and between the light-exit side 27 of the field lens 25 and the rear wall 20 with the reflecting surface 29 of the mirror 28 preferably disposed at a 45° angle to axis of the field lens 25 to project the image in a downward direction.

A second mirror 30 is supported between the side walls 18 and 19 and between the rear wall 20 and the camera lens 14 with the reflecting surface 31 of the mirror 30 being preferably located at a 45° angle relative to the axis of the camera lens 14 to project the image from the mirror 28 into the camera lens 14.

A projector, such as the slide projector 13, may be arranged to project a light image axially toward the light-entrant side 26 of the field lens 25. For this purpose, the partial front wall 21 of the housing is provided with an opening 32 in axial alignment with the field lens 25.

For projection of images from the side projectors 11 and 12, the walls 18 and 19 are respectively provided with openings 33 and 34 and partially transmitting reflectors or mirrors 35 and 36 are supported on the support wall 24 between the field lens 25 and the partial front wall 21 at angular positions such as to project images from the projectors 11 and 12 axially toward the receiving side 26 of the field lens 25. The partially transmitting reflectors or mirrors 35 and 36 will, of course, transmit the image from the projector 13 to the field lens 25 as well as reflecting the images from the projectors 11 and 12 to the field lens 25. If it is desired to use additional projectors, additional openings may be provided in the side walls 18 or 19 and additional partially transmitting reflectors or mirrors may be provided.

It may be here noted that partially transmitting reflectors or mirrors may be any transparent or semi-transparent mirrors such as those of the chromium type which will both reflect light and allow passage of light therethrough.

Figure 3:
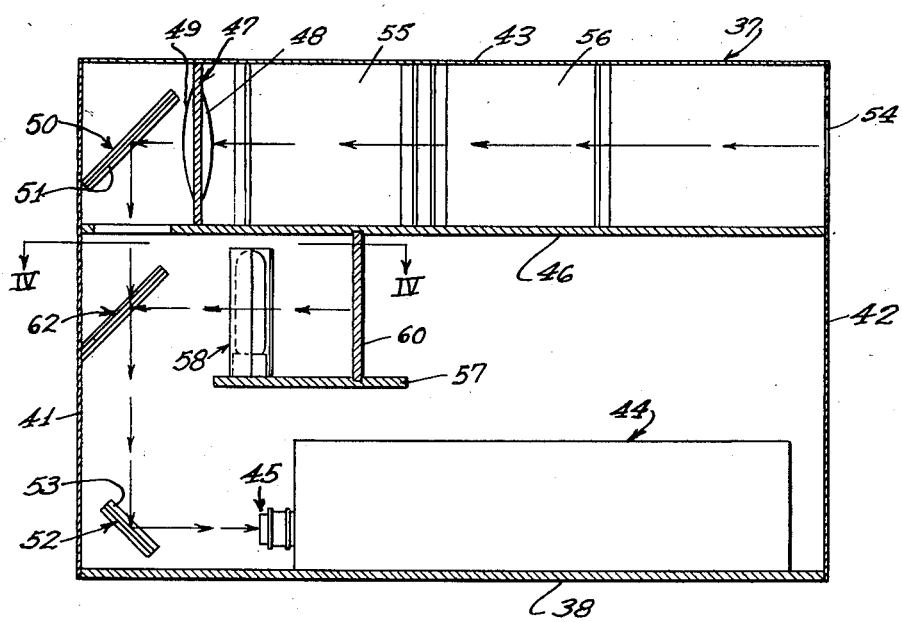
Figure 3 is a sectional view, similar to Figure 2, of a modified housing arrangement.
Figure 4:
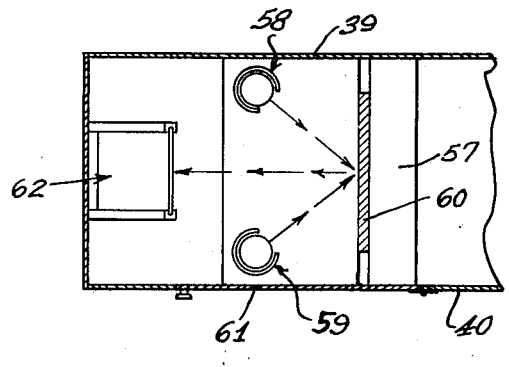
Figure 4 is a sectional view taken substantially along line IV—IV of Figure 3.

Referring now to Figures 3 and 4, reference numeral 37 generally designates another preferred form of housing constructed according to the principles of this invention. The housing 37 comprises a bottom 38, side walls 39 and 40, a rearward end wall 41, a front end wall 42, and a cover 43. A camera 44 is disposed on the bottom wall 38 and has a lens 45.

A support wall 46 is disposed above the camera 44 in spaced relation below the cover 43 and a field lens 47 is supported on the wall 46, the lens 47 having a light-entrant face or side 48 facing the front wall 42 and a light-exit side 49 facing the rear wall 41.

A mirror 50 is supported between the side walls 39 and 40 and between the light-exit side 49 of the field lens 47 and the rear wall 20 with the reflecting surface 51 of the mirror 50 being preferably disposed at a 45° angle to the axis of the field lens 47 to project the image in a downward direction. A second mirror 52 is disposed between the side walls 39 and 40 and between the rear wall 41 and the camera lens 45 with the reflecting surface 53 of the mirror 52 being preferably located at a 45° angle relative to the axis of the camera lens 45 to project the image from the mirror 50 into the camera lens 45.

Figure 2:
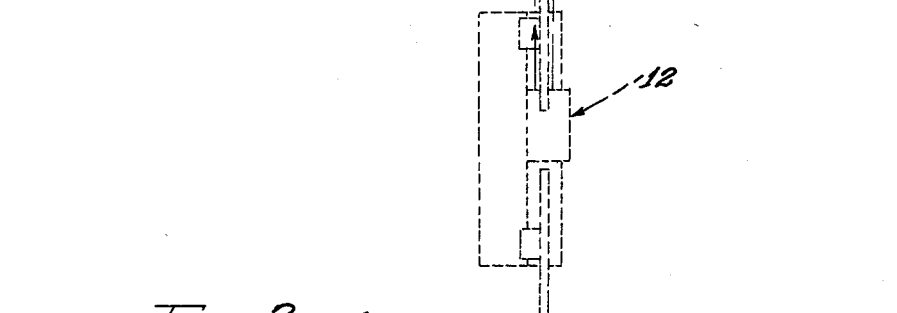
Figure 2 is a sectional view taken substantially along line II—II of Figure 1.
Figure 2:
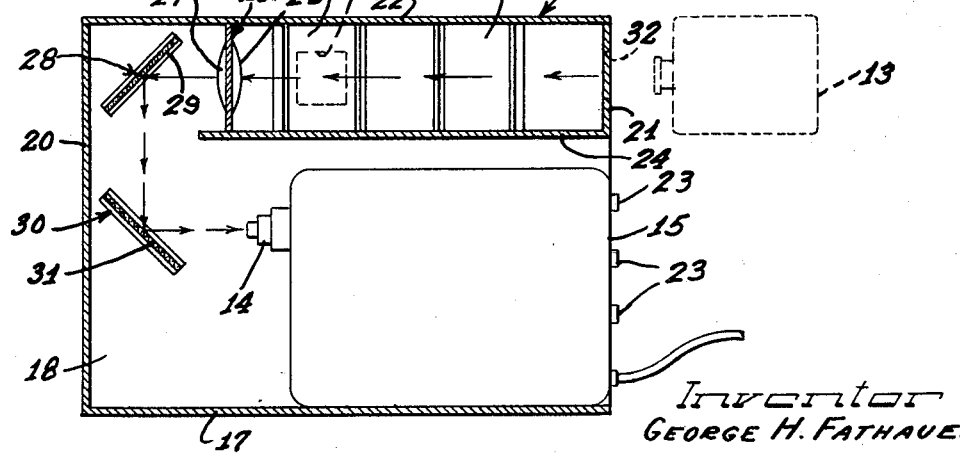

A projector, such as the slide projector 13 in the arrangement of Figures 1 and 2, may be arranged to project a light image axially toward the light-entrant side 48 of the field lens 47, the front wall 42 being provided with an opening 54 for this purpose.

For projection of images from side projectors, such as the projectors 11 and 12 in the arrangement of Figures 1 and 2, the side walls 39 and 40 may be provided with suitable openings and partially transmitting reflectors or mirrors 55 and 56 are supported on the support wall 46 between the field lens 47 and the front wall 42, the mirrors 55 and 56 being disposed at angular positions such as to project images from the side projectors axially toward the receiving side of the field lens 47.

The arrangement as thus far described is substantially the same as the arrangement of Figures 1 and 2, and functions in the same manner. However, the arrangement of Figures 3 and 4 incorporates an additional feature not used in the arrangement of Figures 1 and 2. In particular, it is oftentimes desirable to reproduce or transmit an image from an object such as a photograph or a small object or model. For this purpose, a platform 57 is disposed between the side walls 39 and 40 and between the camera 44 and the support wall 46, the platform 57 being adapted to support a small model or object whose image is to be transmitted or reproduced. A pair of lamps 58 and 59 may be supported on the platform 57 to illuminate the object.

If the object is in the form of a photograph, it may be disposed against a vertical plate 60 between the platform 57 and the support wall 46.

For access, the side wall 40 may have an opening above the platform 57 which may be closed by a hinged door 61.

To transmit an image from the object on the platform 57, a partially transmitting reflector or mirror 62 is supported between the side walls 39 and 40 opposite the space between the platform 57 and the support wall 46 and between the mirrors 50 and 52, the image being transmitted from the partially transmitting reflector or mirror 62 toward the mirror 52 and thence into the lens 45 of the camera 44.

It will, accordingly, be appreciated that this invention provides simple and extremely compact arrangements for projecting images from one or more projectors or objects into a television camera.

It will be understood that modifications and variations may be effected without departing from the spirit and scope of the novel concepts of this invention.

I claim as my invention:

1. In a camera system including a camera having a lens, a field lens, a housing supporting said field lens therewithin with the axis thereof in spaced generally parallel relation to the axis of the camera lens with the light-exit side of said field lens and the light entrant side of the camera lens facing in the same direction, said housing having a first opening for projection of an image axially into the light entrant side of said field lens and a second opening for projection of light in the direction transverse to the axis of said field lens, a partially transmitting mirror between said first opening and said field lens and arranged for projecting an image from said second opening into said field lens, and means supported in said housing for projecting into the camera lens an image projected by said field lens.

2. In a camera system including a camera having a lens, a field lens, a housing supporting said field lens therewithin with the axis thereof in spaced generally parallel relation to the axis of the camera lens and with the light-exit side of said field lens and the light entrant side of the camera lens facing in the same direction, said housing means having a first opening for projection of an image axially into the light entrant end of said field lens and second and third openings for projection of light in directions transverse to the axis of said field lens, a pair of partially transmitting mirrors between said first opening and said field lens and arranged for projecting images from said second and third openings into said field lens, and means supported in said housing for projecting into the camera lens an image projected by said field lens.

3. In a camera system including a camera having a lens, a field lens, a housing supporting said field lens therewithin with the axis thereof in spaced generally parallel relation to the axis of the camera lens and with the light-exit side of said field lens and the light-entrant side of the camera lens facing in the same direction, said housing having at least one opening for projecting a light image into the light-entrant side of said field lens, means for supporting an object to be reproduced in said housing, and means supported in said housing for projecting into the camera lens an image from said object and an image projected by said field lens.

4. In a camera system including a camera having a lens, a field lens, a housing supporting said field lens therewithin with the axis thereof in spaced generally parallel relation to the axis of the camera lens and with the light-exit side of said field lens and the light-entrant side of the camera lens facing in the same direction, said housing having at least one opening for projecting a light image into the light-entrant side of said field lens, a first mirror supported in said housing in the path of light projected from said field lens, a second mirror supported in said housing in the path of light projected from said first mirror and arranged to project light into the camera lens, means for supporting an object to be reproduced in said housing between said camera and said field lens, and a partially transmitting mirror between said first and second mirrors for projecting light from said object to said second mirror to be projected therefrom into the camera lens.

5. In a camera system including a camera having a lens, a housing receiving said camera, a first mirror in said housing in alignment with said camera lens and having a reflecting surface disposed at substantially a 45° angle relative to the axis of said camera lens, a second mirror aligned with said first mirror and having a reflecting surface disposed at substantially a 90° angle relative to the reflecting surface of said first mirror, said housing having a plurality of openings for transmission of images thereinto, means including at least one partially transmitting mirror for transmitting said images along an axis parallel to the axis of said camera lens and intersecting said second mirror with the images being reflected by said second and first mirrors into said camera lens, and a field lens disposed in said housing in the path of projection of images from said openings to said camera lens.

References Cited in the file of this patent

UNITED STATES PATENTS

| | | |
|---|---|---|
| 1,301,538 | Brainerd | Apr. 22, 1919 |
| 1,959,498 | Planskoy | May 22, 1934 |
| 2,071,044 | Savage | Feb. 16, 1937 |
| 2,174,931 | Terry et al. | Oct. 3, 1939 |
| 2,402,822 | Kraft | June 25, 1946 |
| 2,488,177 | Dufour | Nov. 15, 1949 |
| 2,553,903 | Dufour | May 22, 1951 |

FOREIGN PATENTS

| | | |
|---|---|---|
| 309,137 | Great Britain | Mar. 13, 1930 |